(12) United States Patent
Szuba

(10) Patent No.: US 9,371,851 B2
(45) Date of Patent: Jun. 21, 2016

(54) METHOD OF FORMING JOINT FOR INTERCONNECTING ADJACENT ELEMENTS AND JOINT FORMED THEREBY

(71) Applicants: Szuba Consulting, Inc., Dearborn, MI (US); Value Extraction LLC, Dearborn, MI (US)

(72) Inventor: Joseph Szuba, Dearborn, MI (US)

(73) Assignees: SZUBA CONSULTING, INC., Dearborn, MI (US); VALUE EXTRACTION LLC, Dearborn, MI (US)

( * ) Notice: Subject to any disclaimer, the term of this patent is extended or adjusted under 35 U.S.C. 154(b) by 0 days.

(21) Appl. No.: 14/310,692

(22) Filed: Jun. 20, 2014

(65) Prior Publication Data
US 2015/0198193 A1   Jul. 16, 2015

Related U.S. Application Data

(60) Provisional application No. 61/955,929, filed on Mar. 20, 2014, provisional application No. 61/927,656, filed on Jan. 15, 2014.

(51) Int. Cl.
| | | |
|---|---|---|
| *F16B 17/00* | (2006.01) | |
| *F16H 57/02* | (2012.01) | |
| *F16D 65/00* | (2006.01) | |

(52) U.S. Cl.
CPC .............. *F16B 17/002* (2013.01); *F16D 65/00* (2013.01); *F16D 2250/0061* (2013.01); *F16D 2250/0084* (2013.01); *Y10T 29/49826* (2015.01); *Y10T 29/49908* (2015.01); *Y10T 403/4949* (2015.01)

(58) Field of Classification Search
CPC ... E03C 1/181; E03C 1/021; Y10T 29/49826; Y10T 29/49947; Y10T 29/49908; Y10T 29/4992; Y10T 29/49943
See application file for complete search history.

(56) References Cited

U.S. PATENT DOCUMENTS

| | | | |
|---|---|---|---|
| 4,232,580 A * | 11/1980 | Stewart | ........................... 83/835 |
| 5,415,261 A | 5/1995 | Friedmann | |
| 2010/0022344 A1 | 1/2010 | Huang | |
| 2012/0133034 A1 * | 5/2012 | Imura et al. | ................... 257/666 |
| 2012/0244980 A1 | 9/2012 | Su et al. | |
| 2013/0053208 A1 | 2/2013 | Chen | |

FOREIGN PATENT DOCUMENTS

WO    WO2010128832 A2    11/2010

OTHER PUBLICATIONS

PCT/US2014/045239 International Search Report dated Oct. 30, 2014, 3 pages.

* cited by examiner

*Primary Examiner* — John C Hong
(74) *Attorney, Agent, or Firm* — Carlson, Gaskey & Olds

(57) ABSTRACT

A method of forming a joint for interconnecting adjacent elements comprises providing a first element defining at least one aperture extending from a first edge to a second edge through a thickness of the first element. The method further comprises mating a second element to the first element with the second element overlaying the at least one aperture of the first element at the second edge thereof such that the second element extends through the at least one aperture perpendicular to the first element with an excess portion of the second element extending beyond the first edge of the first element. Finally, the method comprises compressing the excess portion of the second element such that the second element is continuous across the at least one aperture and adjacent the first and second edges of the first element, thereby interlocking the first and second elements and forming the joint.

12 Claims, 7 Drawing Sheets

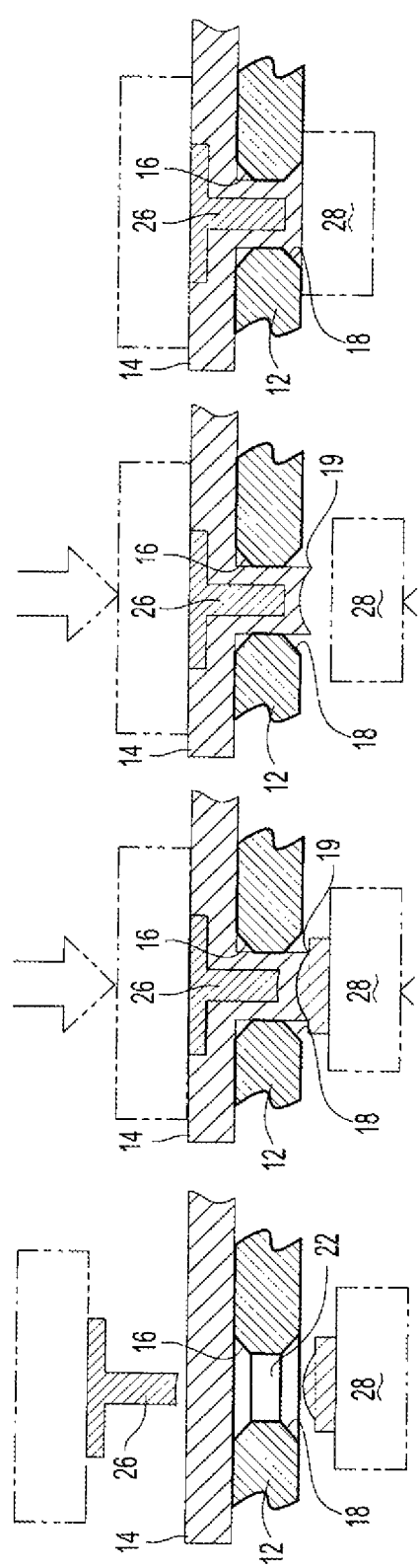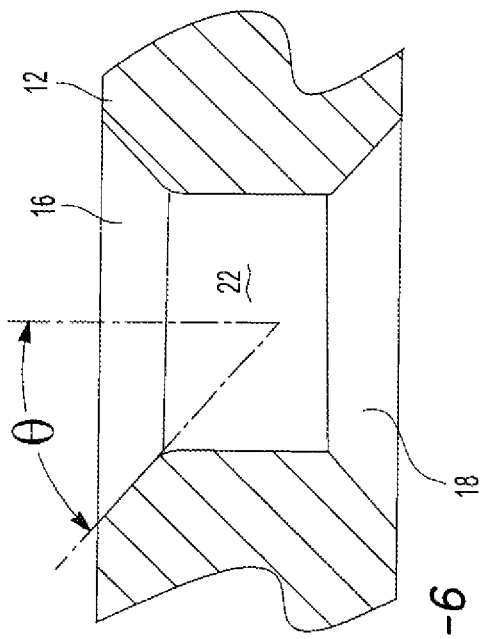

METHOD OF FORMING JOINT FOR INTERCONNECTING ADJACENT ELEMENTS AND JOINT FORMED THEREBY

PRIOR APPLICATIONS

This application claims priority to and all the advantages of U.S. Provisional Patent Application Ser. No. 61/955,929, filed on Mar. 20, 2014 and U.S. Provisional Patent Application Ser. No. 61/927,656, filed on Jan. 15, 2014.

FIELD OF THE INVENTION

The present invention generally relates to a method of forming a joint and, more specifically to a method of forming a joint for interconnecting adjacent elements and to the joint formed by the method.

DESCRIPTION OF THE RELATED ART

Joints and methods of forming joints are well known in the art and utilized in a variety of industries for adjoining adjacent elements or components in an assembly. Joints are commonly prepared based on the materials of the elements or components to be joined. For example, when the elements or components comprise a metal or alloy, one method of adjoining such elements or components is laser welding.

However, laser welding requires expensive equipment, additional processing steps, and deleteriously adds to an overall thickness of the assembly and adjacent elements by virtue of a contributing thickness of the joint itself. Further, laser welding may result in burrs and spatter being disadvantageously introduced to the elements or components, which can result in failure of mechanical assemblies, particularly where there are small tolerances and/or moving parts.

One specific example of a mechanical assembly including such joints is an automotive assembly, such as a transmission clutch housing. It is desirable to minimize weight of components in the transmission clutch housing to improve fuel economy and decrease material cost. However, to achieve a desired strength and longevity, housings are generally required to have a certain minimum thickness, and additional joint layers associated with laser welding add to these minimum thicknesses while suffering from the additional drawbacks identified above. Thus, there remains an opportunity to provide improved methods of adjoining adjacent elements or components.

SUMMARY OF THE INVENTION

The present invention provides a method of forming a joint for interconnecting adjacent elements being subject to divergent forces. The method comprises the step of providing a first element defining at least one aperture extending from a first edge to a second edge through a thickness of the first element. The method further comprises mating a second element to the first element with the second element overlaying the at least one aperture of the first element at the second edge thereof such that the second element extends through the at least one aperture perpendicular to the first element with an excess portion of the second element extending beyond the first edge of the first element. Finally, the method comprises compressing the excess portion of the second element such that the second element is continuous across the at least one aperture and adjacent the first and second edges of the first element, thereby interlocking the first and second elements and forming the joint.

The present invention also provides the joint formed in accordance with the method.

The inventive method obviates the significant costs associated with conventional methods of joining elements, e.g. laser welding. Further, the inventive method provides joints that are free from spatter and burrs associated with such laser welding. Additionally, the inventive method may be utilized to form joints which do not provide any additional thickness to the adjacent elements that are interconnected via the joint, which is advantageous in many industries where thicknesses are of significant concern. Finally, the inventive method forms joints having excellent strength and longevity that are not susceptible to failure, unlike many conventional joints.

The inventive method and resulting joints may be utilized in various diverse industries, such as residential and commercial construction, automotive housings, and in the construction and mating of train components, ship components, plane components, white goods and machines, etc.

BRIEF DESCRIPTION OF THE DRAWINGS

The above, as well as other advantages of the present invention, will become readily apparent to those skilled in the art from the following detailed description of a preferred embodiment when considered in light of accompanying drawings in which:

FIG. 4A is a sectional view showing an initial step of one method of forming the joint of the present invention;

FIG. 4B is a sectional view showing another step of one method of forming the joint of the present invention;

FIG. 4C is a sectional view showing yet another step of one method of forming the joint of the present invention;

FIG. 4D is a sectional view showing the joint of the present invention formed in FIGS. 4A-4C;

FIG. 5 is a sectional view showing a portion of the joint of the present invention during its formation;

FIG. 6 is a sectional view showing an aperture for forming the joint of the present invention;

DETAILED DESCRIPTION OF THE INVENTION

Figure 1:
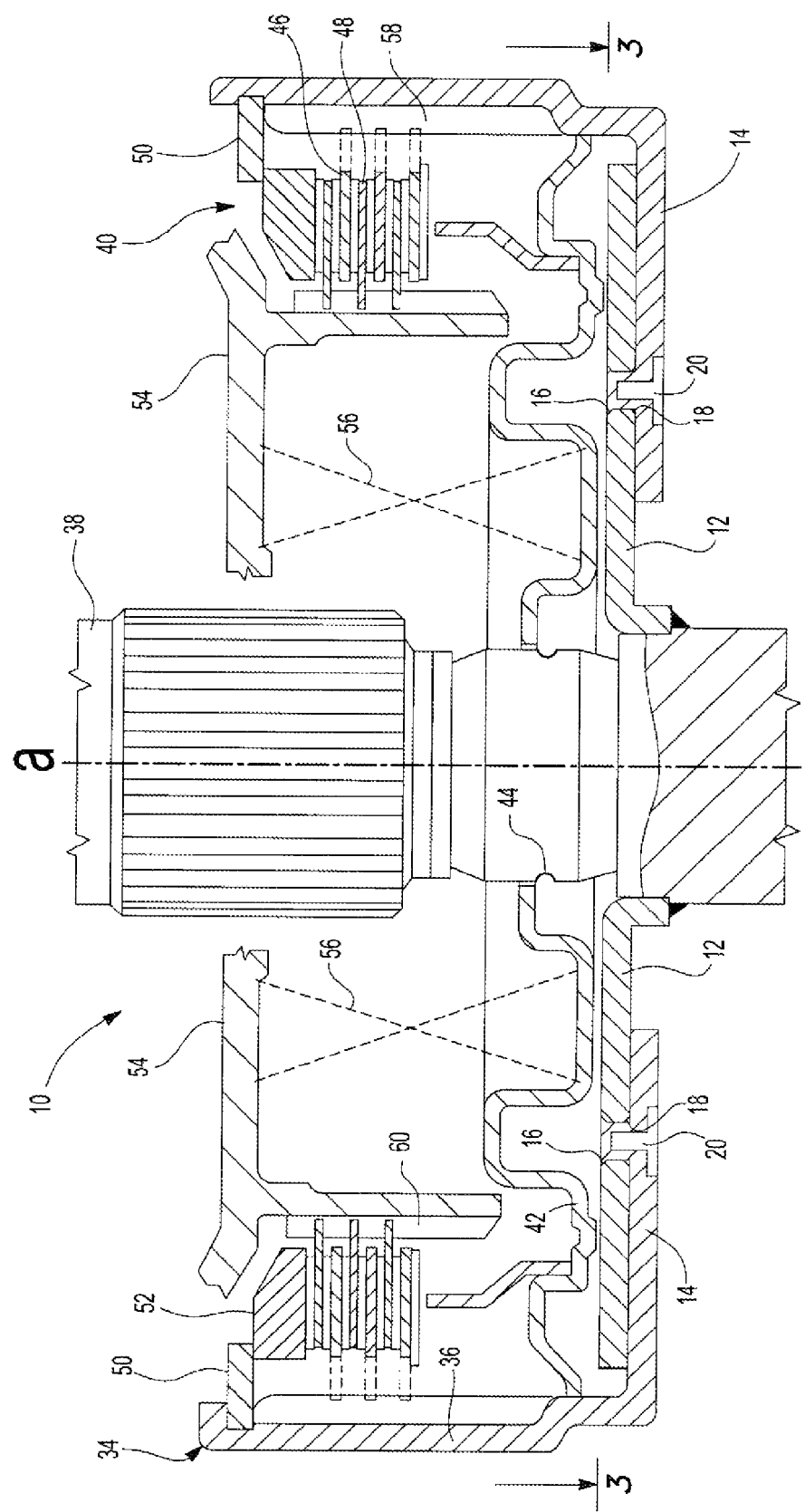
FIG. 1 shows a cross-sectional view of a clutch assembly including a joint according to the present invention.

Referring to FIG. 1, a side sectional view of a clutch assembly including a joint according to the present invention is generally shown at 10, with the joint interconnecting a first element 12 and a second element 14 within the assembly 10. It is to be appreciated that the joint is not limited to use in such assemblies 10. For example, the joint may be utilized in other applications, such as other automotive housings, e.g. differential housings, torque converter housings, catalytic converter housings, and brake housings, as well as in the construction and mating of train components, ship components, plane components, etc., as described below.

The assembly 10 of FIG. 1 including the joint is first described, following by a description of various methods of forming the joint. In the embodiment of FIG. 1, the assembly 10 includes a housing 34 defined by an annular wall 36. The annular wall 36 circumscribes a transmission shaft 38 that defines a shaft axis A. In this embodiment, the annular wall 36 of the housing 34 extends axially between an open end 40 and the second element 14, which serves as and may be referred to herein with respect to this embodiment as a floor. The second element 14 extends radially inwardly toward the transmission shaft 38. A piston 42 circumscribes the transmission shaft 38 and is positioned adjacent the second element 14 of the housing 34. The first element 12 in this embodiment seals the second element 14 of the housing 34 and the transmission shaft 38. Transmission fluid pumps through the transmission shaft 38 through outlets 44 and to the space located between the piston 42 and the floor of the housing 34 to shift the clutch assembly 10 in a known manner. A fibrous plate 48 circumscribes the transmission shaft 38 and is positioned in an abutting relationship between the piston 42 and a plurality of clutch plates 46. The clutch plates 46 are separated by fibrous plates 48. Clutch plates 46 and the fibrous plates 48 circumscribe the transmission shaft 38 and are retained in the housing 34 by snap ring 50 as will be explained further herein below. A clutch pressure plate 52 is disposed between the plurality of clutch plates 46, the fibrous plates 48, and the snap ring 50. A shift member 54 overlies the open end 40 of the housing 34 and provides biasing support to biasing member 56 for biasing the piston 42 toward the floor of the housing 34. For example, the joint may be utilized in the construction of the clutch assembly of U.S. Pat. No. 8,240,446, which is incorporated by reference herein in its entirety. Moreover, the joint may be utilized in other clutch assemblies, such as those not including the formed retention ring of U.S. Pat. No. 8,240,446.

Figure 2:
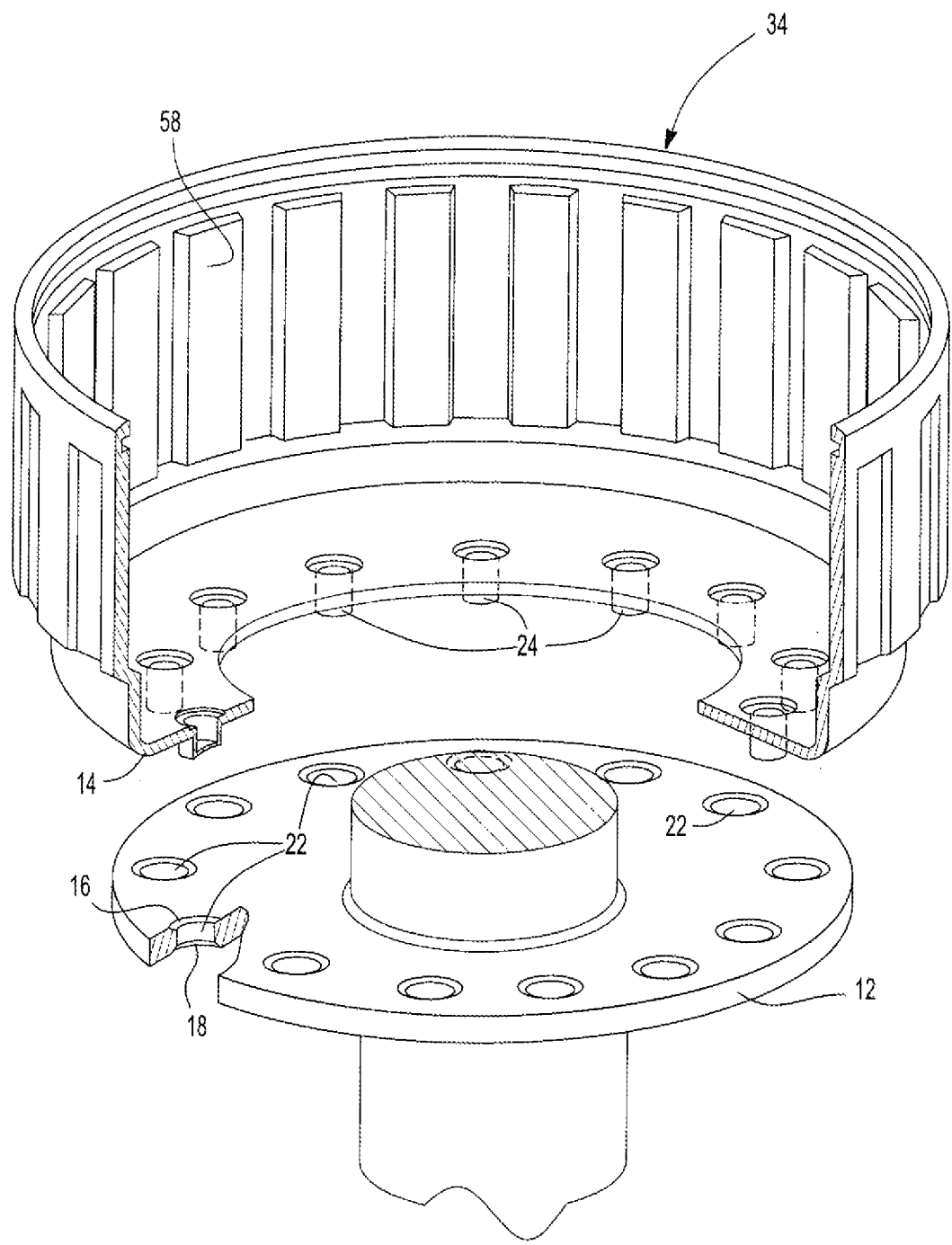
FIG. 2 shows a fragmented, perspective view of the clutch housing of FIG. 1 prior to forming the joint of the present invention.

The housing 34 defines a plurality of housing splines 58 spaced around a full 360° of the housing 34 as best shown in FIG. 2. The shift member 54 defines a plurality of member splines 60 as seen in FIG. 1 so that the housing splines 58 and the member splines 60 are opposed enabling positioning of the clutch plates 26 engage either the housing splines 58 or the member splines 60 as shown in FIG. 1. Therefore, it should be understood by those of ordinary skill in the art that the clutch plates 46 define a plurality of spaced teeth (not shown) that engage the housing splines 58 in a gear-like manner.

The present invention provides a method of forming the joint for interconnecting adjacent elements that are subject to divergent forces. The divergent forces may each independently be, for example, linear, angular, etc. The adjacent elements are referred to herein as the first element 12 and the second element 14, and the first and second elements 12, 14 may be various elements or components of various assemblies, as introduced above. Referring to the FIGS, the first element 12 defines at least one aperture 22 extending from a first edge 16 to a second edge 18 through a thickness of the first element 12. Typically, the first element 12 defines a plurality of apertures 22, as the apertures 22 are utilized to form the joint, and use of additional joints increases the strength and longevity of assemblies including such joints. For clarity, "the aperture," as used herein, may refer to but one aperture 22 defined by the first element 12 or the plurality of apertures 22. The method further comprises mating the second element 14 to the first element 12 with the second element 14 overlaying the at least one aperture 22 of the first element 12 at the second edge 18 thereof such that the second element 14 extends through the at least one aperture 22 perpendicular to the first element 12 with an excess portion 19 of the second element 14 extending beyond the first edge 16 of the first element 12. This mating step may be carried out in a variety of techniques, as set forth below. Finally, the method comprises compressing the excess portion 19 of the second element 14 such that the second element 14 is continuous across the at least one aperture 22 and adjacent the first and second edges 16, 18 of the first element 12, thereby interlocking the first and second elements 12, 14 and forming the joint.

Figure 7A:
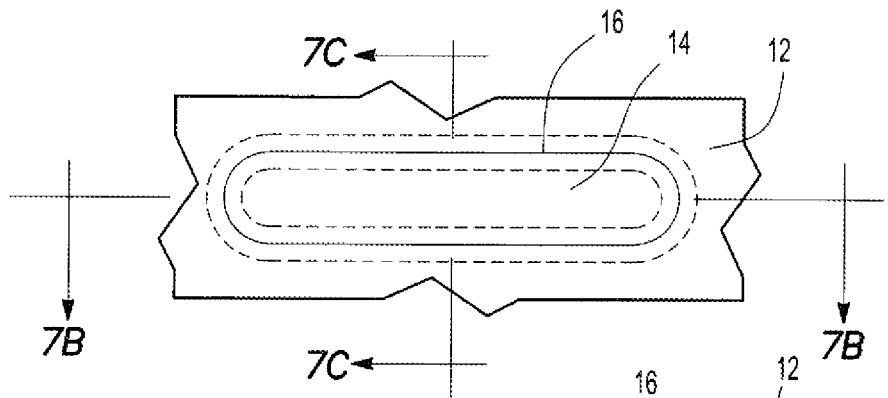
FIG. 7A is a plan view of one embodiment of the joint of the present invention.
Figure 7B:
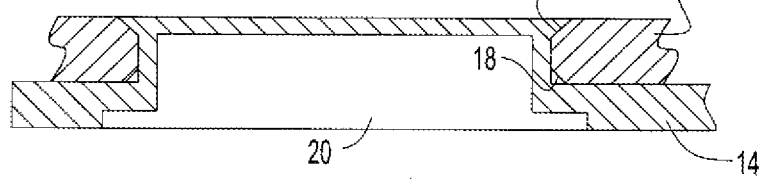
FIG. 7B is a sectional view of line 7B-7B of FIG. 7A showing the joint of the present invention.
Figure 7C:
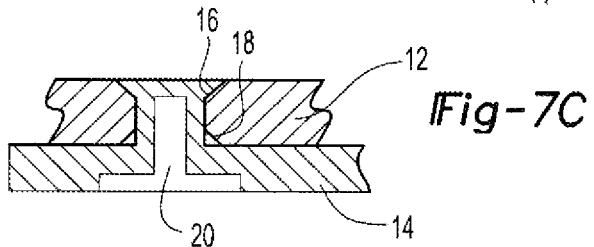
FIG. 7C is a sectional view of line 7C-7C of FIG. 7A showing the joint of the present invention.
Figure 8:
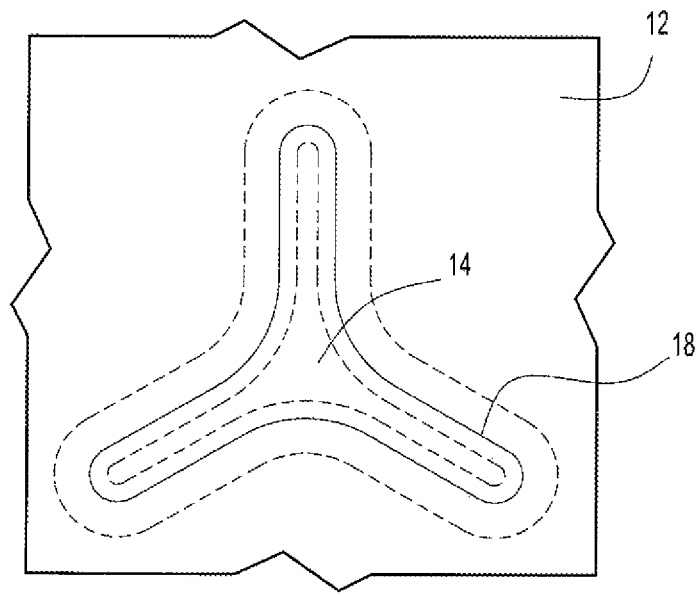
FIG. 8 is a plan view showing another embodiment of the joint of the present invention.
Figure 9A:
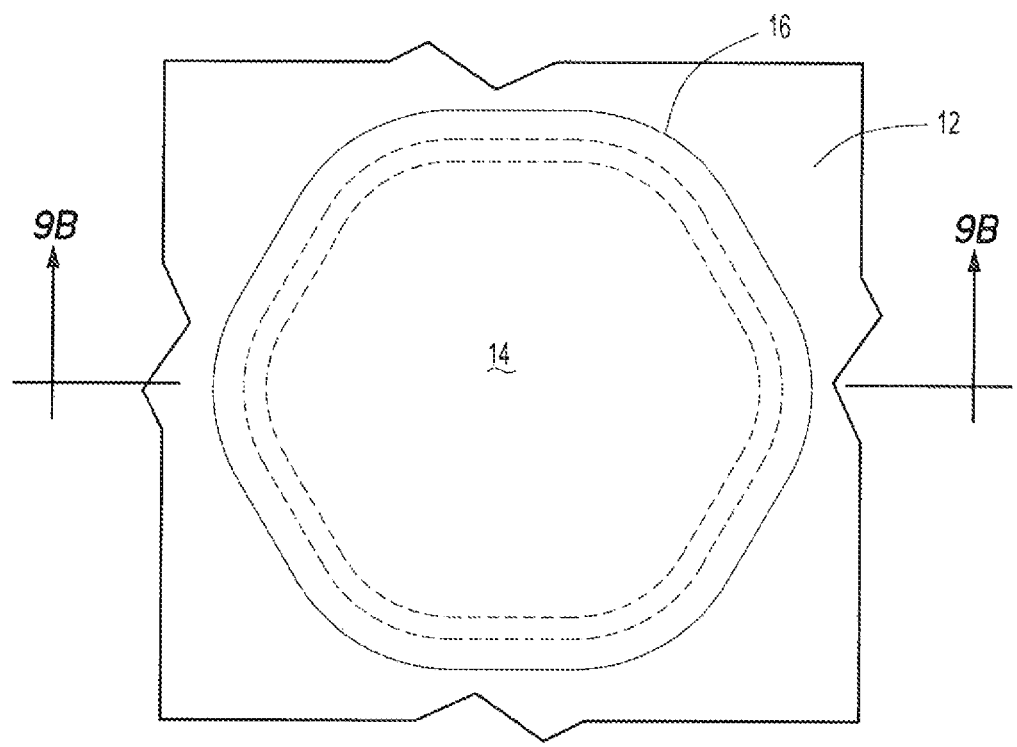
FIG. 9A is a plan view showing one embodiment of the joint of the present invention.

In various embodiments as shown throughout the FIGS., the first edge 16 of the first element 12 is further defined as a chamfered edge. Chamfering the first edge 16 of the first element 12 may be carried out via known methods. The chamfered edge 16 of the first element 12 typically presents an acute angle θ relative to an axis b of the aperture 22 of the first element 12, as shown in FIG. 6. The acute angle θ is from greater than 0 to less than 90, alternatively from greater than 10 to less than 80, degrees. The acute angle θ may be selected based on a desired surface area contact between the first and second elements 12, 14, as this surface area contact generally impacts the strength of the joint. In particular, the acute angle θ and the surface area contact between the first and second elements 12, 14 is directly proportional. The surface area contact may be modified based on the actuate angle θ and a shape of the aperture 22, which may be any conventional shape (e.g. circular, rectangular, etc.) or may be irregular, as shown in FIGS. 7A, 8, and 9A. Chamfering of the first edge 16 may be carried out at the same time the aperture 22 is formed, e.g. via the same machining equipment, or before or after formation of the aperture 22.

In these or other embodiments, and as shown throughout the FIGS., the second edge 18 of the first element 12 is rounded. As known in the art, rounded edges are distinguished from chamfered edges, with rounded edges presenting a radius and chamfered edges presenting an angle. When the second edge 18 of the first element 12 is rounded, preparation of the joint, particularly with respect to mating the first and second elements 12, 14 and disposing a portion of the second element 14 in the aperture 22 of the first element 12, can be more easily accomplished.

FIG. 2 shows an exploded view associated with the formation of the joint via a first embodiment to form the clutch assembly 10 of FIG. 1. In the embodiment of FIG. 2, the second element 14 includes a plurality of preformed protuberances 24 corresponding to the shape and location of the plurality of apertures 22 of the first element 12. The preformed protuberances 24 are referred to as being "preformed" because they are formed prior to mating the first and second elements 12, 14, in contrast to the second embodiment disclosed below. The preformed protuberances 24 may be formed via a variety of techniques, e.g. mechanical punching. The preformed protuberances 24 may have a variety of shapes, which may be regular or irregular, and which generally correspond to the shape of the aperture 22. Further, the preformed protuberances 24 may optionally be dimpled or have other features at distal ends thereof for the subsequent compression step. In the embodiment of FIG. 2, the preformed protuberances 24 generally extend for a distance greater than the thickness of the first element 12. As such, upon mating the first and second elements 12, 14, the preformed protuberances 24 form the excess portion (not shown) of the second element 14. To form the joint in the embodiment of FIG. 2, after disposing the preformed protuberances 24 of the second element 14 in the apertures 22 defined by the first element 12, the excess portions of the preformed protuberances 24, i.e., the portions of the preformed protuberances that extend beyond the second edge 18 of the first element 12, are compressed. The excess portions may be compressed via known mechanical pressing techniques. Typically, such compression deforms the preformed protuberances 24 to flatten the preformed protuberances 24 along the chamfered edge 16 of the first element 12, while also increasing a strength of the material of the second element that is compressed and deformed. In this embodiment, the joint is flush and presents a substantially continuous surface across a side of the first element 12 opposite the second element 14. Said differently, the second element 14 may be substantially continuous across the aperture 22 defined by the first element 12. If desired, however, the second element 14 may be raised slightly even after the step of compressing the excess portion of the second element 14, e.g. in applications where thickness tolerances are not of concern.

Figure 13A:
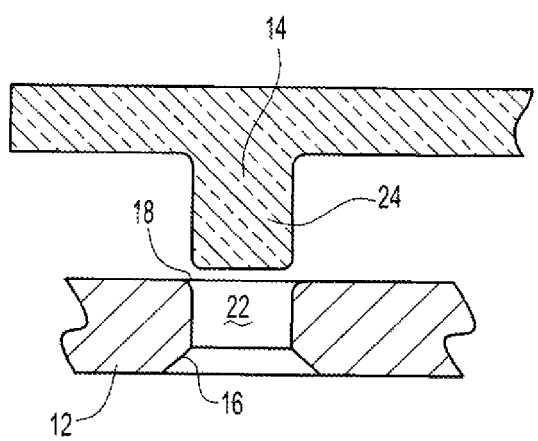
FIG. 13A is a sectional view showing an initial step of an alternative method of forming the joint of the present invention.
Figure 13B:
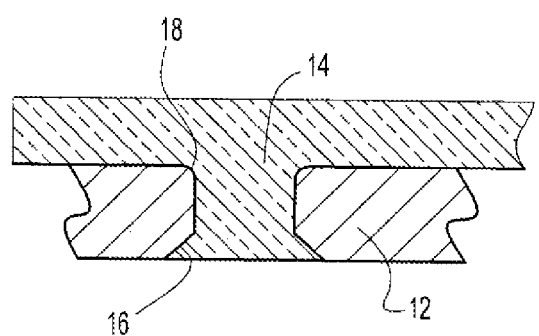
FIG. 13B is a sectional view showing the alternative embodiment of the joint formed in FIG. 13A.

FIGS. 13A and 13B show a sectional view of the formation of the joint in accordance with the first embodiment of FIG. 2, but with the preformed protuberance 24 characteristic of a cast housing. In particular, FIG. 13A illustrates the second element 14 including the preformed protuberance 24 and the first element 12 defining the aperture 22, and FIG. 13B illustrates the formed joint after compressing the excess portion (not shown) of the second element 14 to flatten the excess portion about the chamfered edge 16 of the first element 12, thus interlocking the first and second elements 12, 14 and giving the joint.

Figure 3:
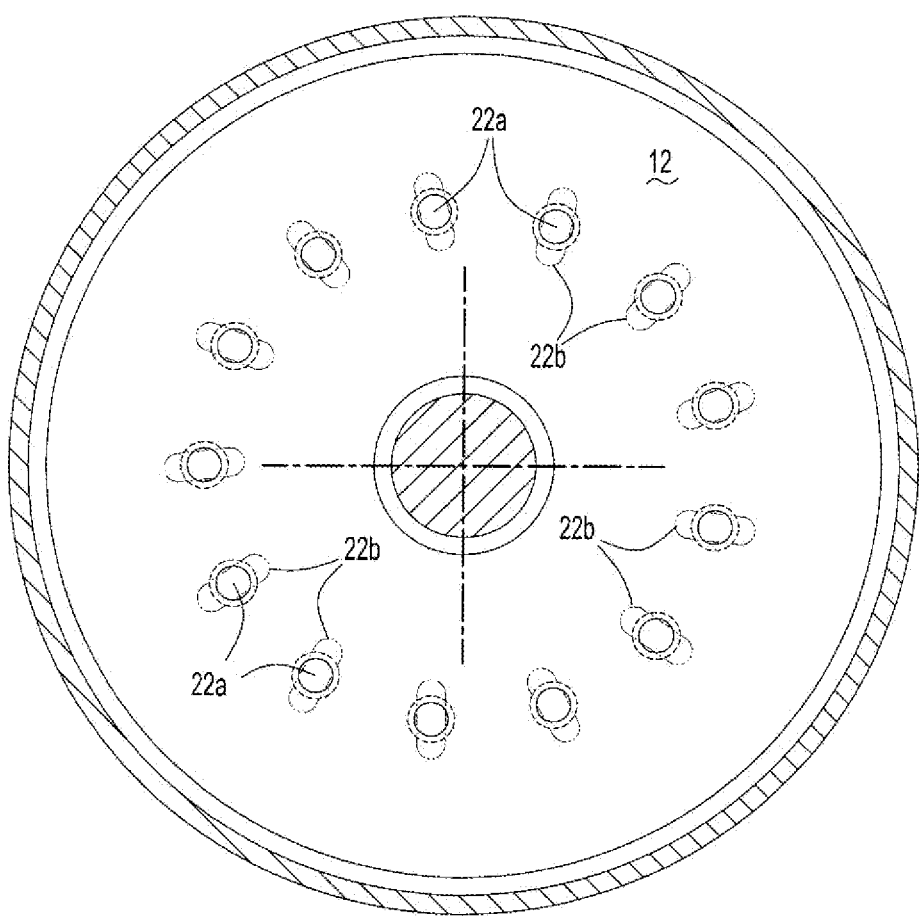
FIG. 3 shows a plan view of the clutch housing prior to forming the joint of the present invention.

FIG. 3 shows a top view of the first element 12 defining the apertures 22 associated with FIG. 2. As shown in FIG. 3 and introduced above, the apertures 22 may be, for example, circular, as illustrated at 22a, or irregular, as illustrated at 22b.

A second embodiment of the method to form the joint is shown in FIGS. 4A-4D. In this second embodiment, the excess portion 19 is not from a preformed protuberance, as in the first embodiment, but instead is formed by deforming the second element 14. As shown in FIG. 4A, in this second embodiment, mating the first and second elements 12, 14 merely comprises aligning the first and second elements 12, 14 in a parallel and adjacent relationship. A forming tool 26, which may alternatively be referred to as a die button, is aligned with the aperture 22 of the first element 12. As shown in FIG. 4B, the forming tool 26 is pressed into the second element 14 in a direction toward the first edge 16 of the first element 12 for a distance less than the thickness of the first element 12 to partially dispose the forming tool 26 and the second element 14 in the aperture 22 of the first element 12. In this embodiment, the second element 14 generally comprises a malleable and/or ductile material that is capable of such deformation, e.g. a metal or alloy. Similarly, the forming tool 26 typically comprises a sufficiently rigid material, e.g. a metal or alloy that is the same as or different from the second element 14. Alternatively, the forming tool 26 may comprise a urethane or other rigid polymeric material. Although the forming tool 26 is disposed in the aperture 22 of the first element 12 for a distance less than the thickness of the first element 12, the contributing thickness of the second element 14 results in the formation of the excess portion 19 of the second element 14 extending beyond the second edge 18 of the first element 12. When the first element 12 defines a plurality of apertures 22, deforming the second element 14 in the plurality of apertures 22 of the first element 12 may be carried out simultaneously via a single step, e.g. with a plate including a plurality of forming tools 26 extending therefrom, or in series.

FIG. 4B illustrates an optional step associated with this second embodiment of forming the joint. Specifically, FIG. 4B shows a press 28 with a rounded attachment imparting a dimple to the excess portion 19 of the second element 14. This pressing step is typically carried out with the forming tool 26 and opposite press being flush with the first element 12 to prevent the second element 14 and forming tool 26 from being forced from the aperture 22. Typically, use of this pressing step and the resulting dimple in the excess portion 19 makes compression of the excess portion 19, particularly with regards to overlaying the excess portion 19 about the chamfered edge 18 of the first element 12, much easier, although this step is not required. The rounded press 28 may comprise the same material or a different material as the forming tool 26, although the rounded attachment of the press 28 similarly is capable of deforming the excess portion 19 of the second element 14. FIG. 5 shows a sectional view of the second element 14 with the forming tool 26 disposed therein following this optional pressing step with the rounded attachment of the press 28.

FIG. 4C shows the press 28 without the rounded attachment immediately prior to compressing the excess portion 19 of the second element 14. As with the optional step described immediately above, this pressing step is typically carried out with the forming tool 26 and opposite press being flush with the first element 12 to prevent the second element 14 and forming tool 26 from being forced from the aperture 22 while compressing the excess portion 19 of the second element 14. When the first element 12 defines a plurality of apertures, the press 28 may be utilized to simultaneously compress the excess portions 19 simultaneously.

FIG. 4D shows the joint upon compressing the excess portion 19 of the second element 14 such that the second element 14 is continuous across the aperture 22 and adjacent the first and second edges 16, 18 of the first element 12, thereby interlocking the first and second elements 12, 14. In FIG. 4D, the forming tool 26 is still disposed in the joint. If desired, the forming tool 26 may be left to remain in the joint. Alternatively, the forming tool 26 may be removed from the joint, which results in the joint defining a recess 20 associated with a shape and position of the forming tool 26, as shown in FIG. 1. For example, the forming tool 26 may be integral with the plate such that separating the plate from the second element 14 removes the forming tool 26 from the joint and second element 14. The recess 20 and resulting joint may alternatively be referred to as a tenon.

Figure 9B:
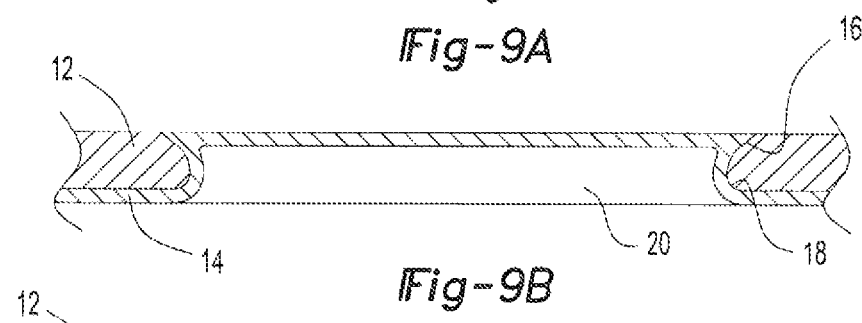
FIG. 9B is a sectional view of line 9B-9B of FIG. 9A showing the joint of the present invention.

FIGS. 7A-9B show alternative embodiments of the joint when the aperture 22 is irregularly shaped. For example, in FIG. 7A, the aperture 22 is an elongated ellipse. FIGS. 7B and 7C show sectional views across lines 7B-7B and 7C-7C in FIG. 7A to show the different dimensions of the joint and associated recess 20 from removal of the forming tool 26. FIG. 8 shows yet another joint when the aperture 22 and resulting joint is irregularly shaped. The aperture 22 and resulting joint of FIG. 8 is triangular in nature for maximizing surface area contact between the first and second elements 12, 14 while decreasing volume of the aperture 22, which provides joints having excellent strength and longevity. The aperture 22 and resulting joint of FIG. 9 is hexagonal in nature with rounded corners.

Figure 10:
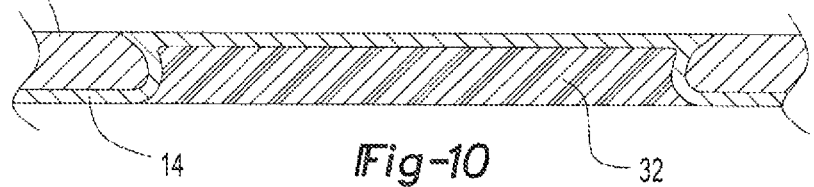
FIG. 10 is a sectional view showing the joint of FIG. 9B but with a strengthening agent.

FIG. 10 shows a sectional view of an alternative embodiment of the joint of FIG. 9B. In particular, in FIG. 9A, the forming tool 26 is removed from the joint to define the recess 20. However, in FIG. 10, a strengthening agent 32 is disposed in the recess 20 of the joint to increase a strength thereof. The strengthening agent may be, for example, a cured composition, such as a urethane, an epoxy, etc. One of skill in the art readily understands that numerous different types of curable compositions may be cured to give cured products having excellent rigidity, and any of these curable compositions may be utilized to form the strengthening agent 32. In embodiments including the strengthening agent 32, the method typically further comprises disposing a curable composition in the recess 20 of the joint and curing the curable composition to give the strengthening agent 32. The curable composition may be cured via a variety of techniques depending on the curable composition selected, e.g. heat, atmospheric moisture, irradiation, etc. Further, the strengthening agent 32 may be selected and utilized for minimizing noise, vibration, and harshness associated with certain mechanical assemblies including the joint.

Figure 11:
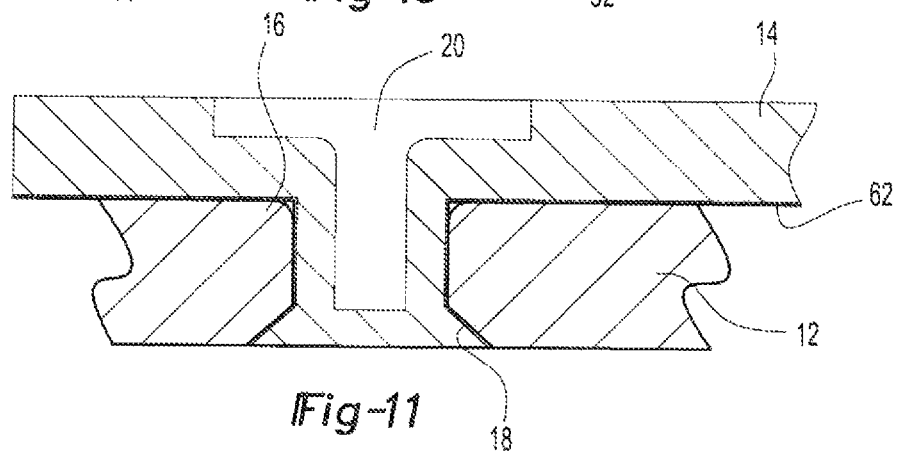
FIG. 11 is a sectional view showing an alternative embodiment of the joint of the present invention including a passivating layer.

The material of the first and second elements 12, 14 may be independently selected and may vary based upon an application or end use of the joint. In various embodiments, the first element 12 comprises steel or a similar metal or alloy, and the second element 14 comprises aluminum. As understood in the art, contact between different types of metals or alloys, as in certain embodiments of the joint, results in galvanic corrosion, which is undesirable. To prevent such galvanic corrosion, the joint may include a passivating layer 62 between the first and second elements 12, 14, as shown in FIG. 11. The passivating layer 62 is disposed between the first and second elements 12, 14, to prevent direct contact therebetween and to minimize or prevent corrosion thereof. The passivating layer 62 may comprise any known material to prevent corrosion of metals. For example, the passivating layer 62 may be a protective coating formed from a coating composition. Alternatively, the passivating layer 62 may comprise an electroplated surface of the first and/or second elements 12, 14. The passivating layer 62 may be applied to one or both of the first and second elements 12, 14 prior to forming the joint.

Figure 12:
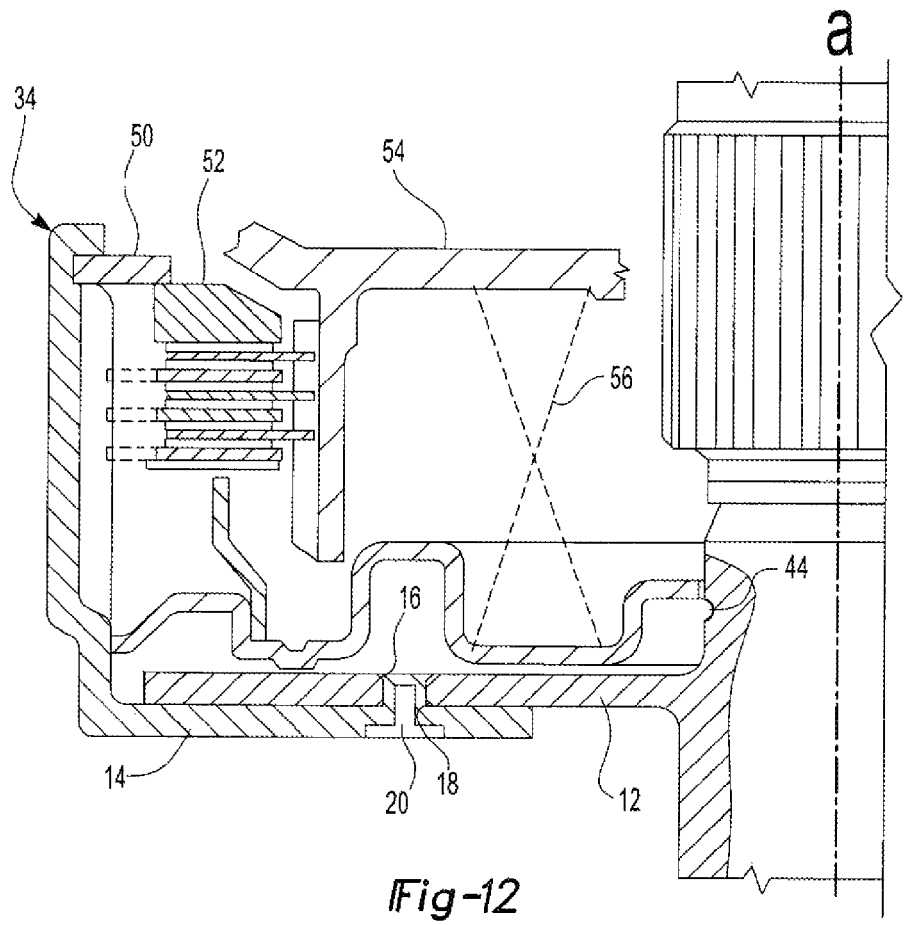
FIG. 12 shows a partial sectional view of a clutch assembly including a joint according to the present invention.

FIG. 12 shows an alternative embodiment of the clutch assembly of FIG. 1 where the first element 12 is a unitary piece with an exterior portion of the transmission shaft 38. This alternative embodiment illustrates that the inventive method can be utilized in various housing assemblies.

As noted above and best shown in FIG. 1, the inventive method is particularly suitable for automotive housing assemblies. In fact, use of the inventive method provides increased strength and longevity as compared to conventional automotive housing assemblies assembled via laser welding. As such, use of the inventive method in assembling housings allows for decreased housing thicknesses, thus providing material cost savings and decreasing a weight of the housing assembly and improving a gas efficiency of an automobile including the same. In fact, it is believed that thicknesses of such housings may be reduced to 2.5, alternatively 2.0, alternatively 1.75, alternatively 1.5, millimeters, which is significantly less than the traditional 3.5 millimeter thicknesses of such housings. Further, the inventive method may be utilized in applications beyond transportation, such as consumer appliances, e.g. washing machines, dryers, and other white goods or major appliances, which also are commonly assembled via welding techniques.

However, as introduced above, the inventive method is not so limited. For example, the inventive method may be utilized to assemble airplanes, e.g. to attach metallic skin to an aircraft body in lieu of rivets. The inventive method may eliminate protrusions associated with rivets, which impact air resistance and fuel economy of airplanes. The inventive method may also be utilized in ships, trains, and other non-transportation applications where adjacent elements must be adjoined.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation while material to the teachings of the invention without departing from the essential scope thereof. Therefore, it is intended that the invention not be limited to the particular embodiment disclosed as the best mode contemplated for carrying out this invention but that the invention will include all embodiments falling within the scope of the appended claims.

What is claimed is:

1. A method of forming a joint for interconnecting adjacent elements being subject to divergent forces, said method comprising the steps of:
   providing a first element defining at least one aperture extending from a first edge to a second edge through a thickness of the first element;
   mating a second element to the first element with the second element overlaying the at least one aperture of the first element at the second edge thereof such that the second element extends through the at least one aperture perpendicular to the first element with an excess portion of the second element extending beyond the first edge of the first element; and
   compressing the excess portion of the second element such that the second element is continuous across the at least one aperture and adjacent the first and second edges of the first element, thereby interlocking the first and second elements and forming the joint so that the excess portion becomes substantially coplanar with said second element.

2. The method set forth in claim 1 further comprising the step of deforming the second element after mating the second element to the first element to form the excess portion.

3. The method set forth in claim 2 wherein deforming the second element comprises pressing a forming tool into the second element in a direction toward the first edge of the first element for a distance less than the thickness of the first element to partially dispose the forming tool and the second element in the at least one aperture.

4. The method set forth in claim 3 wherein compressing the excess portion is carried out with the forming tool partially disposed in the at least one aperture and wherein removing the forming tool after compressing the excess portion defines a recess in the joint.

5. The method set forth in claim 4 further comprising disposing a strengthening agent in the recess of the joint.

6. The method set forth in claim 1 wherein providing the first element further comprises forming the at least one aperture into the first element.

7. The method set forth in claim 1 wherein the first edge of the first element is further defined as a chamfered edge.

8. The method as set forth in claim 7 wherein the chamfered edge presents an acute angle relative to an axis of the at least one aperture of the first element.

9. The method set forth in claim 7 wherein compressing the excess portion of the second element comprises compressing the excess portion of the second element over and adjacent the chamfered edge of the aperture.

10. The method set forth in claim 9 wherein the joint is flush with the chamfered edge of the first element.

11. The method set forth in claim 1 wherein the at least one aperture is further defined as an irregularly shaped aperture.

12. The method set forth in claim 1 further comprising disposing a passivating layer between the second element and the first element.

* * * * *